(12) United States Patent
Chang et al.

(10) Patent No.: US 10,203,443 B2
(45) Date of Patent: Feb. 12, 2019

(54) LIGHT EMITTING DEVICE AND LIGHT GUIDE PLATE THEREOF

(71) Applicant: E Ink Holdings Inc., Hsinchu (TW)

(72) Inventors: Mei-Chen Chang, Hsinchu (TW); Sheng-Chieh Tai, Hsinchu (TW); Ching-Huan Liao, Hsinchu (TW)

(73) Assignee: E Ink Holding Inc., Hsinchu (TW)

( * ) Notice: Subject to any disclaimer, the term of this patent is extended or adjusted under 35 U.S.C. 154(b) by 100 days.

(21) Appl. No.: 15/243,989

(22) Filed: Aug. 23, 2016

(65) Prior Publication Data

US 2017/0205555 A1 Jul. 20, 2017

(30) Foreign Application Priority Data

Jan. 18, 2016 (TW) .............................. 105101387 A

(51) Int. Cl.
*F21V 8/00* (2006.01)
*G02F 1/167* (2006.01)
*F21V 13/04* (2006.01)
*F21V 5/04* (2006.01)

(52) U.S. Cl.
CPC ............ *G02B 6/0036* (2013.01); *G02F 1/167* (2013.01); *F21V 5/04* (2013.01); *F21V 13/04* (2013.01)

(58) Field of Classification Search
CPC ......... G02F 1/167; G02B 6/0036; F21V 5/04; F21V 13/04
See application file for complete search history.

(56) References Cited

U.S. PATENT DOCUMENTS

| | | | | |
|---|---|---|---|---|
| 6,749,311 B2* | 6/2004 | Suzuki | ................. | G02B 6/0018 362/23.16 |
| 7,090,388 B2* | 8/2006 | Yagi | ..................... | G02B 6/0028 362/560 |
| 7,431,481 B2* | 10/2008 | Stefanov | ............... | F21S 48/215 362/327 |

(Continued)

FOREIGN PATENT DOCUMENTS

| CN | 2638097 Y | 9/2004 |
|---|---|---|
| CN | 201000493 Y | 1/2008 |

(Continued)

OTHER PUBLICATIONS

Corresponding Taiwanese Office Action that these art references were cited on Dec. 1, 2016.
Corresponding Chinese office action dated Dec. 5, 2018.

*Primary Examiner* — Anh Mai
*Assistant Examiner* — Arman B Fallahkhair
(74) *Attorney, Agent, or Firm* — CKC & Partners Co., Ltd.

(57) ABSTRACT

A light emitting device includes a light guide plate and a light source. The light guide plate has a first surface, a second surface that is opposite to the first surface, at least one third surface, and a light incident surface. The third surface and the light incident surface are between the first and second surfaces. The third surface is adjacent to the light incident surface and has a concave-convex structure. The light source is located on the light incident surface. When the light source emits light, the light of the light source enters the light guide plate and transmits to the concave-convex structure, such that the light irradiates out from the concave-convex structure due to refraction, and is reflected back to the light guide plate by the concave-convex structure.

3 Claims, 7 Drawing Sheets

(56) References Cited

U.S. PATENT DOCUMENTS

| | | | |
|---|---|---|---|
| 7,760,290 B2 | 7/2010 | Kang et al. | |
| 7,824,092 B2 | 11/2010 | Yang et al. | |
| 7,936,411 B2 * | 5/2011 | Kim | G02B 6/002 349/56 |
| 8,073,303 B2 * | 12/2011 | Whang | E04C 2/54 359/599 |
| 8,134,661 B2 | 3/2012 | Hamada et al. | |
| 8,287,172 B2 * | 10/2012 | Kuwayama | G02B 6/0018 349/65 |
| 8,430,552 B2 | 4/2013 | Lin et al. | |
| 8,992,062 B2 | 3/2015 | Oku et al. | |
| 9,121,978 B2 * | 9/2015 | Huang | G02B 6/0035 |
| 9,377,170 B2 * | 6/2016 | Gebauer | F21S 48/225 |
| 2002/0041441 A1 | 4/2002 | Wang | |
| 2008/0278658 A1 | 11/2008 | Kim et al. | |
| 2010/0315811 A1 | 12/2010 | Chen et al. | |
| 2013/0215639 A1 | 8/2013 | Lin et al. | |
| 2014/0111736 A1 | 4/2014 | An et al. | |
| 2015/0103393 A1 | 4/2015 | Huang | |

FOREIGN PATENT DOCUMENTS

| | | |
|---|---|---|
| CN | 201673274 U | 12/2010 |
| CN | 103293761 A | 9/2013 |
| CN | 203533430 U | 4/2014 |
| CN | 204629365 U | 9/2015 |

\* cited by examiner

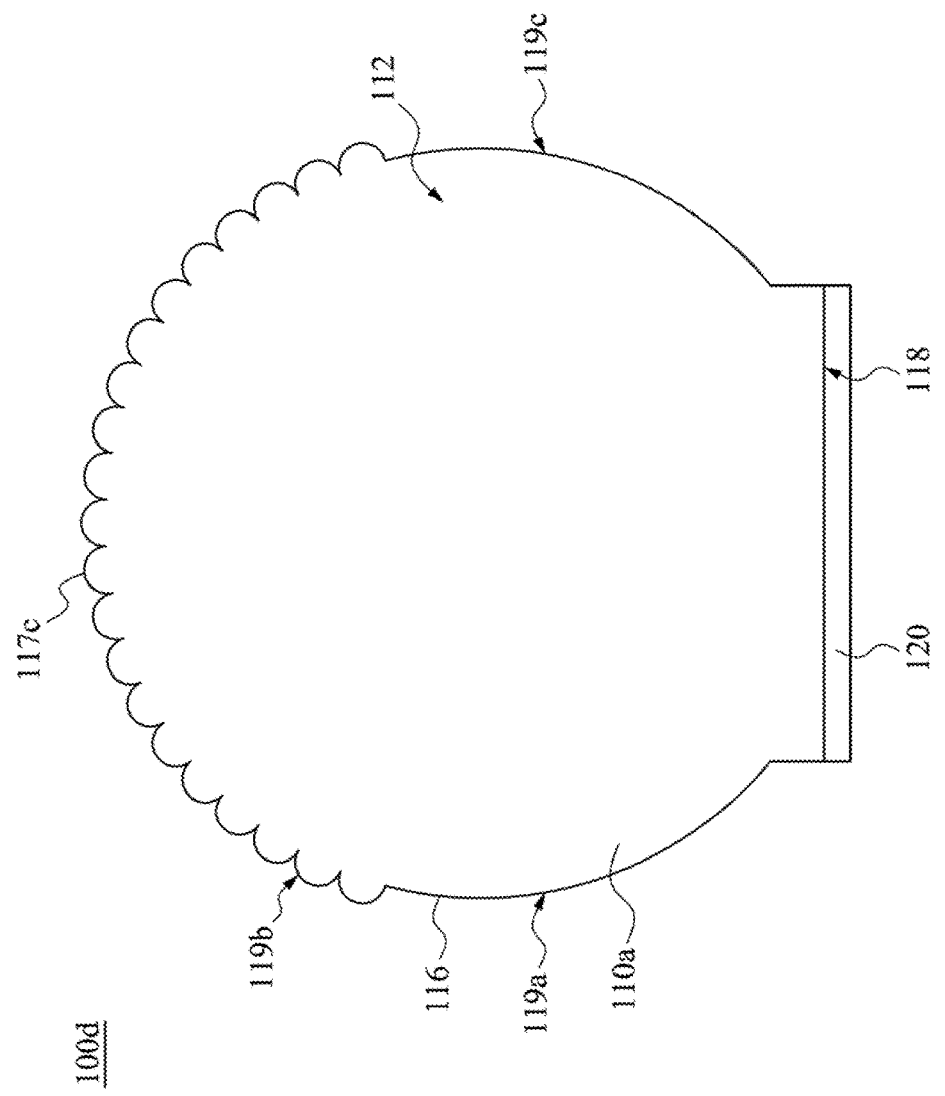

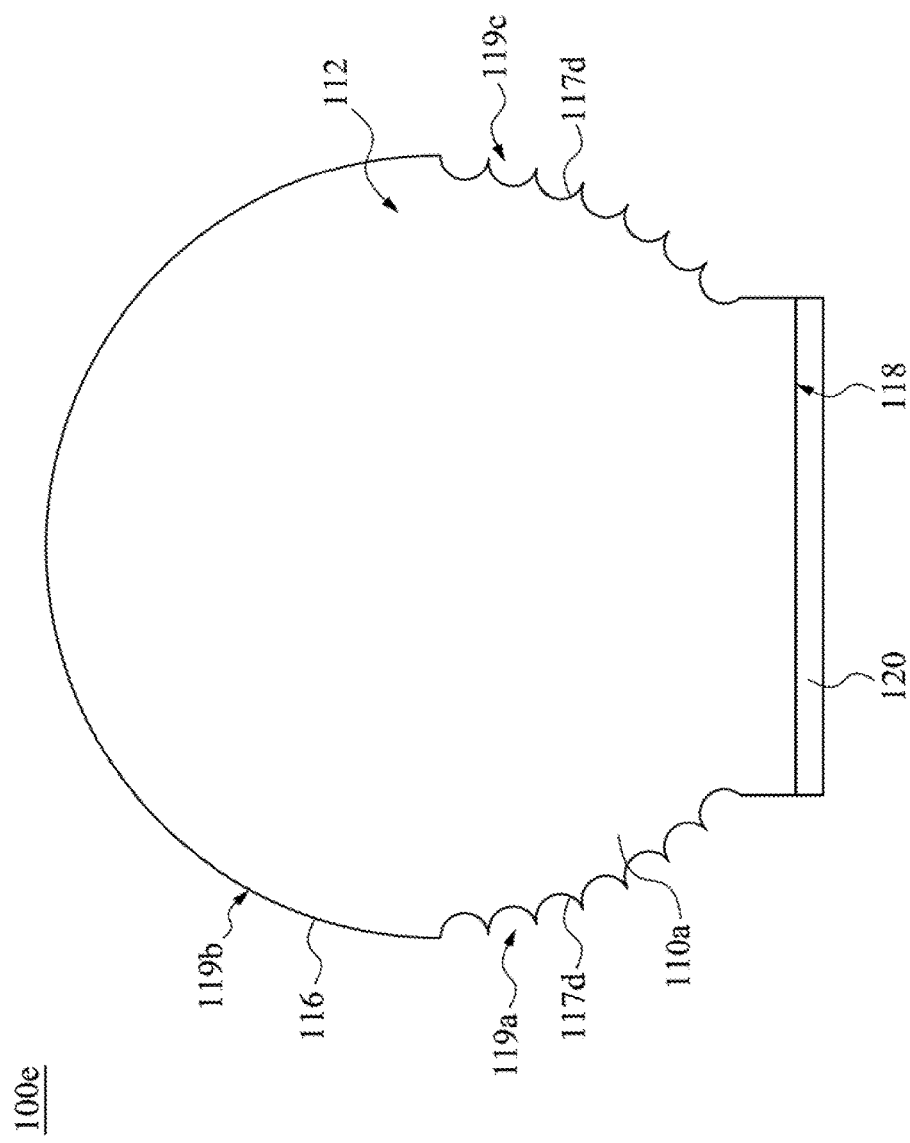

LIGHT EMITTING DEVICE AND LIGHT GUIDE PLATE THEREOF

RELATED APPLICATIONS

This application claims priority to Taiwanese Application Serial Number 105101387, Jan. 18, 2016, which is herein incorporated by reference.

BACKGROUND

Field of Invention

The present invention relates to a light emitting device and a light guide plate of the light emitting device.

Description of Related Art

In recent years, the applications of display devices have become more and more diversified, such as wearable devices, remote controls, electronic tags, advertising boards, etc. Hence, the designs for the shapes of display devices has significantly increased. For example, when a display device is used in a television or computer screen, the shape of the display device is usually rectangular; when a display device is used in a smart watch, the display device may be designed with a round shape, a rhombus shape, or other specific shapes. Accordingly, the shape of a light guide plate disposed in the display device needs to be changed along with the shape of the display device.

Some geometry may affect optical paths in the light guide plate to cause the degradation of desired optical conditions, such as a bright line, a light region, or a dark band. In order to solve the aforesaid problem, when a typical light guide plate is rectangular, a general solution is to form optical dots on a region that has relatively low brightness, such that the brightness of the region is increased to decrease the bright line that is formed by light and dark contrast. However, the aforesaid method of using the optical dots cannot improve an undesired optical condition caused by the shape or edge of the light guide plate. For example, light in a circular light guide plate may be reflected by the edge of the light guide plate, such that bright line may be formed at the semicircle of the light guide plate away from the optical-coupling region of the light guide plate that is adjacent to a light source due to the shape design of the light guide plate. In addition, when a light guide plate has a smooth edge due to its manufacturing process, the smooth edge reflecting light and a corner that light cannot arrive at may form light and dark contrast and a degradation of the desired optical conditions.

SUMMARY

An aspect of the present invention is to provide a light emitting device.

According to an embodiment of the present invention, a light emitting device includes a light guide plate and a light source. The light guide plate has a first surface, a second surface that is opposite to the first surface, at least one third surface, and a light incident surface. The third surface and the light incident surface are located between the first surface and the second surface. The third surface is adjacent to the light incident surface, and has a concave-convex structure. The light source is located on the light incident surface. When the light source emits light, the light of the light source enters the light guide plate and transmits to the concave-convex structure, such that the light irradiates out from the concave-convex structure due to refraction and is reflected back to the light guide plate by the concave-convex structure.

Another aspect of the present invention is to provide a light guide plate.

According to an embodiment of the present invention, a light guide plate includes a first surface, a second surface opposite to the first surface, a light incident surface, and a third surface. The light incident surface and the third surface are located between the first surface and the second surface. The third surface is adjacent to the light incident surface and has a concave-convex structure to refract and reflect light that is from the light incident surface.

In the aforementioned embodiment of the present invention, the third surface of the light guide plate is adjacent to the light incident surface, and the light incident surface and the third surface are located between the first surface and the second surface. In other words, the third surface and the light incident surface may be regarded as side surfaces of the light guide plate. The third surface of the light guide plate has the concave-convex structure. Hence, when the light source emits light, the light of the light source may enter the light guide plate and transmits to the concave-convex structure of the third surface. As a result, the light may irradiate out from the concave-convex structure due to refraction and be reflected back to the light guide plate by the concave-convex structure. The light guide plate of the present invention may utilize the concave-convex structure on the side surfaces to change the reflection angle of the light in the light guide plate, such that bright line or a light region can be prevented from forming in a specific region of the light guide plate (e.g., a position near the edge of the light guide plate). As a result, the optical feeling of the light emitting device with respect to the sense of sight may be improved.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows:

FIG. 6 is a front view of a light emitting device according to one embodiment of the present invention; and FIG. 7 is a front view of a light emitting device according to one embodiment of the present invention.

DETAILED DESCRIPTION

Figure 1:
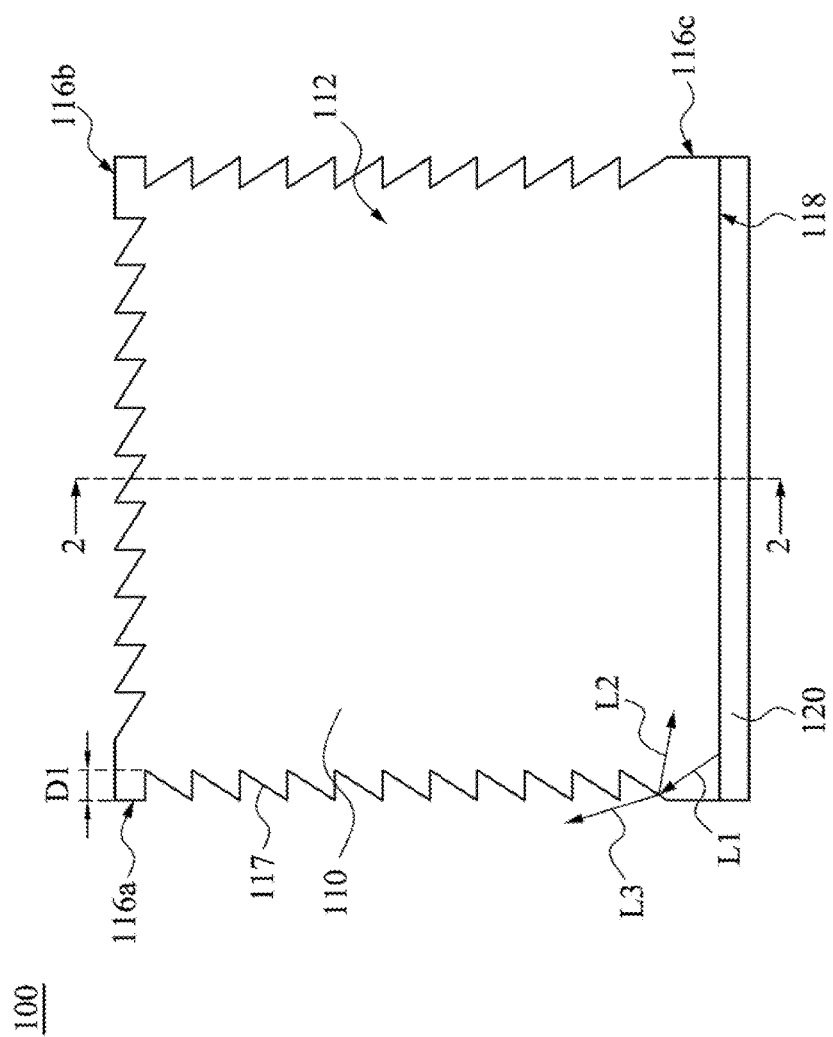
FIG. 1 is a front view of a light emitting device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
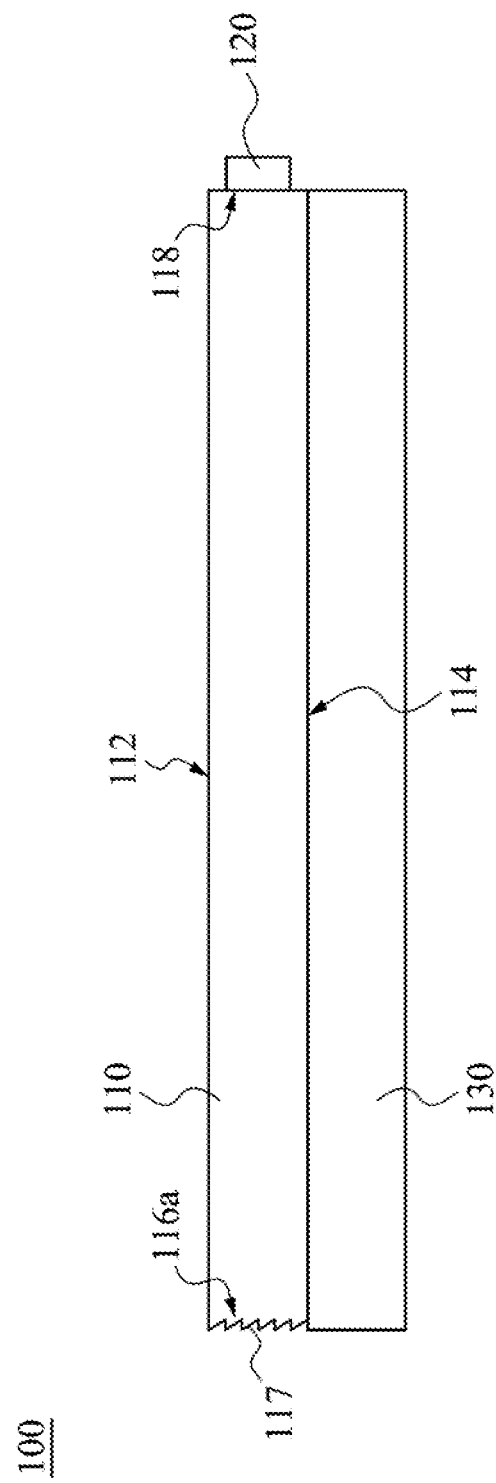
FIG. 2 is a cross-sectional view of the light emitting device taken along line 2-2 shown in FIG. 1.

FIG. 1 is a front view of a light emitting device 100 according to one embodiment of the present invention. FIG. 2 is a cross-sectional view of the light emitting device 100 taken along line 2-2 shown in FIG. 1. As shown in FIG. 1 and FIG. 2, the light emitting device 100 includes a light guide plate 110 and a light source 120. In this embodiment, the light guide plate 110 is rectangular, but the present invention is not limited in this regard. The light guide plate 110 has a first surface 112, a second surface 114 that is opposite to the first surface 112, three third surfaces 116a, 116b, 116c that are connected, and a light incident surface 118. The third surfaces 116a, 116b, 116c and the light incident surface 118 are located between the first surface 112 and the second surface 114. Two end edges of the third surface 116b are respectively adjacent to the third surfaces 116a, 116c, and the third surfaces 116a, 116c are respectively adjacent to two end edges of the light incident surface 118. Moreover, the third surface 116b is opposite to the light incident surface 118, and the other two third surfaces 116a, 116c are opposite to each other. In other words, the third surfaces 116a, 116b, 116c and the light incident surface 118 may be regarded as side surfaces of the light guide plate 110, and the first and second surfaces 112, 114 may be regarded as light emitting surfaces of the light guide plate 110.

In this embodiment, each of the third surfaces 116a, 116b, 116c has a concave-convex structure 117. However, in another embodiment, only one or two of the third surfaces 116a, 116b, 116c has the concave-convex structure 117. For example, only the third surface 116b facing away from the light source 120 is designed to form the concave-convex structure 117, and the third surfaces 116a, 116c have no concave-convex structure 117 as deemed necessary by designers.

The light source 120 is located on the side of the light incident surface 118 of the light guide plate 110. When the light source 120 emits light (e.g., light L1), due to the third surfaces 116a, 116b, 116c of the light guide plate 110 have the concave-convex structure 117, the light (e.g., the light L1) of the light source 120 may enter the light guide plate 110 from the light incident surface 118, and transmits to the concave-convex structure 117 of the third surfaces 116a, 116b, 116c.

As a result, the light (e.g., the light L1) may be reflected back to the light guide plate 110 by the concave-convex structure 117 (e.g., light L2), and may irradiate out from the concave-convex structure 117 due to refraction (e.g., light L3). In other words, the concave-convex structure 117 of the third surfaces 116a, 116b, 116c of the light guide plate 110 may be used to reflect and refract the light that is from the incident surface 118 (e.g., the light L1). Hence, the concave-convex structure 117 may prevent the light from excessively gathering at the edge of the light guide plate 110, and the brightness of the edge of the light guide plate 110 can be effectively reduced, in a way that the brightness of the entire light guide plate 110 may be uniform.

For example, the light L2 reflected by the concave-convex structure 117 does not focus on the edge of the light guide plate 110. Furthermore, since the light L3 is refracted to irradiate out from the concave-convex structure 117, the brightness of the light L2 is reduced. The light guide plate 110 of the present invention may utilize the concave-convex structure 117 on the side surface to change the reflection angle of the light in the light guide plate 110, such that bright line or a light region can be prevented from forming in a specific region of the light guide plate 110 (e.g., a position near the edge of the light guide plate 110). As a result, the desired optical conditions of the light emitting device 100 with respect to the sense of sight may be improved. In addition, since the side surface of the light guide plate 110 has the concave-convex structure 117, the light reflected by the concave-convex structure 117 can keep on transmitting in the light guide plate 110 with continuous reflection and refraction. As a result, a region that the light cannot arrive (a dark region) is not easily formed, thereby preventing the light guide plate 110 from forming light and dark contrast to improve the desired optical conditions.

It is to be noted that the light L1, L2, L3 shown in FIG. 1 are only used as examples. In fact, the light source 120 may emit plural light, the concave-convex structure 117 may receive these light to form corresponding reflected light and refracted light, and the present invention is not limited in this regard.

In this embodiment, the shape of the concave-convex structure 117 is triangle, but the present invention is not limited thereto. The shape of the concave-convex structure 117 may also be semicircular, semiellipse, wedge, or a combination of triangle, semicircular, and semiellipse. The concave-convex structure 117 may be recessed in the third surfaces 116a, 116b, 116c of the light guide plate 110, and a perpendicular distance D1 between a bottom end of the concave-convex structure 117 and the third surface that the bottom end is located (116a, 116b, or 116c) may be in a range from 0.5 mm to 1.0 mm. In addition, the concave-convex structure 117 may be formed by die cutting, but the present invention is not limited in this regard.

The light emitting device 100 may further includes a display layer 130. The light guide plate 110 is located on the display layer 130. When the light source 120 emits light, the light enters the light guide plate 110, and a few of light may be reflected and refracted by the concave-convex structure 117. In addition, most of the light remains irradiating out from the first and second surfaces 112, 114 of the light guide plate 110. The first surface 112 may face the users, and the second surface 114 may face the display layer 130. The display layer 130 may receive the light from the second surface 114, such that the image of the display layer 130 may be clearly shown. In this embodiment, the display layer 130 may be an electrophoresis display module, but the present invention is not limited in this regard. The light emitting device 100 may be used in a wearable device (e.g., a smart watch), a remote control, an electronic tag, a display device, a television, and an advertising board.

It is to be noted that the connection relationships and materials of the elements described above will not be repeated in the following description, and only aspects related to other types of light emitting device will be described.

Figure 3:
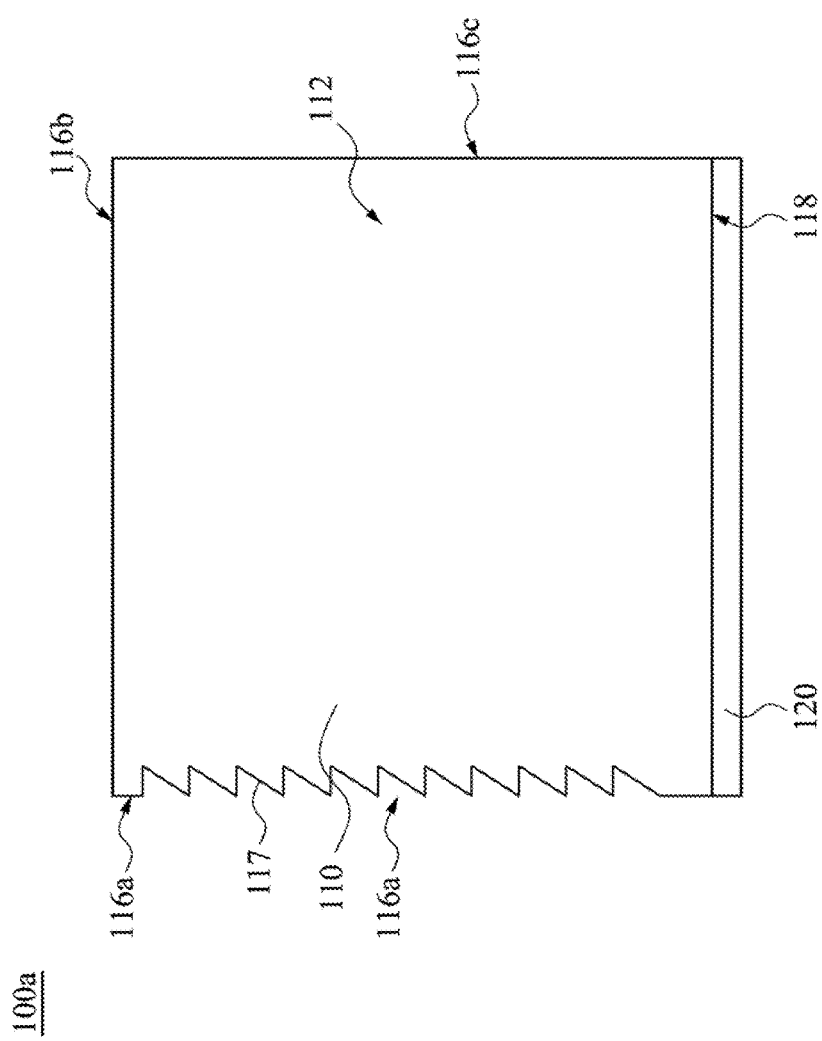
FIG. 3 is a front view of a light emitting device according to one embodiment of the present invention.

FIG. 3 is a front view of a light emitting device 100a according to one embodiment of the present invention. The light emitting device 100a includes the light guide plate 110 and the light source 120. The difference between this embodiment and the embodiment shown in FIG. 1 is that only the third surface 116a of the light guide plate 110 has the concave-convex structure 117, and the third surfaces 116b, 116c do not have concave-convex structure 117. When the light source 120 emits light, the light of the light source 120 may enter the light guide plate 110 from the light incident surface 118 and transmit to the concave-convex structure 117 of the third surface 116a, such that the light may irradiate out from the concave-convex structure 117 due to refraction, and may be reflected back to the light guide plate 110 by the concave-convex structure 117. Hence, the light guide plate 110 can be prevented from forming light and dark contrast in a specific region, thereby improving the desired optical conditions.

Figure 4:
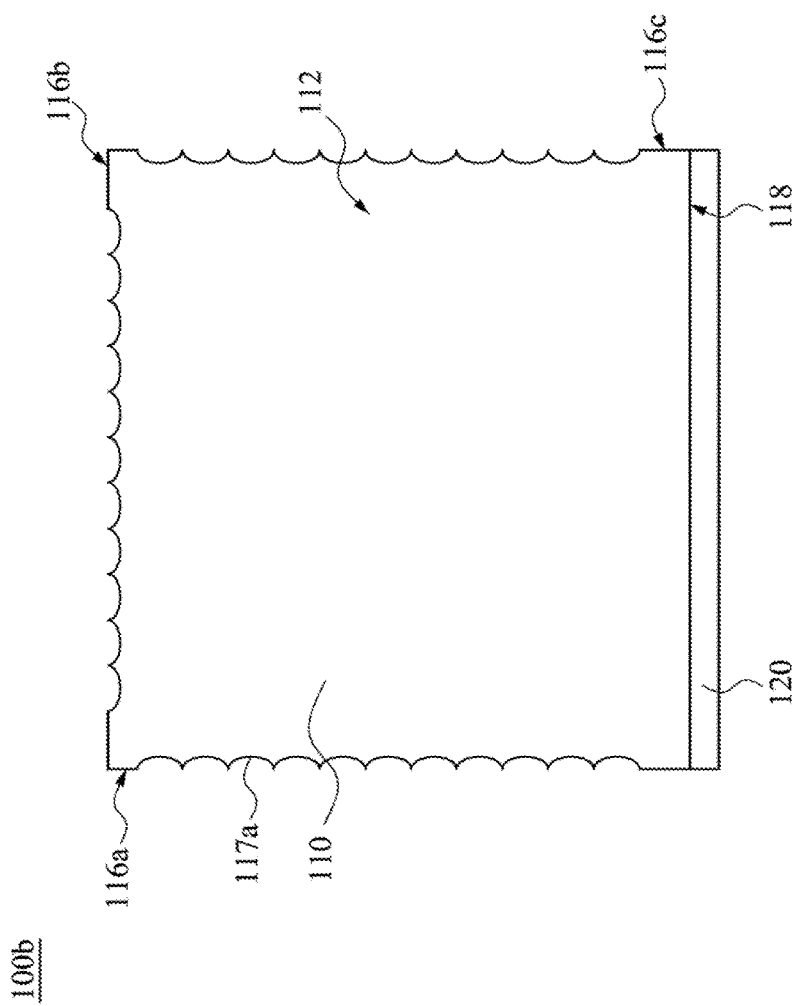
FIG. 4 is a front view of a light emitting device according to one embodiment of the present invention.

FIG. 4 is a front view of a light emitting device 100b according to one embodiment of the present invention. The light emitting device 100b includes the light guide plate 110 and the light source 120. The difference between this embodiment and the embodiment shown in FIG. 1 is that the shape of a concave-convex structure 117a of the light guide plate 110 is recessed semiellipse. When the light source 120 emits light, the light of the light source 120 may enter the light guide plate 110 from the light incident surface 118 and transmit to the concave-convex structure 117a of the third surfaces 116a, 116b, 116c, such that the light may irradiate out from the concave-convex structure 117a due to refraction, and may be reflected back to the light guide plate 110 by the concave-convex structure 117a. Hence, the light guide plate 110 can be prevented from forming light and dark contrast in a specific region, thereby improving the desired optical conditions.

Figure 5:
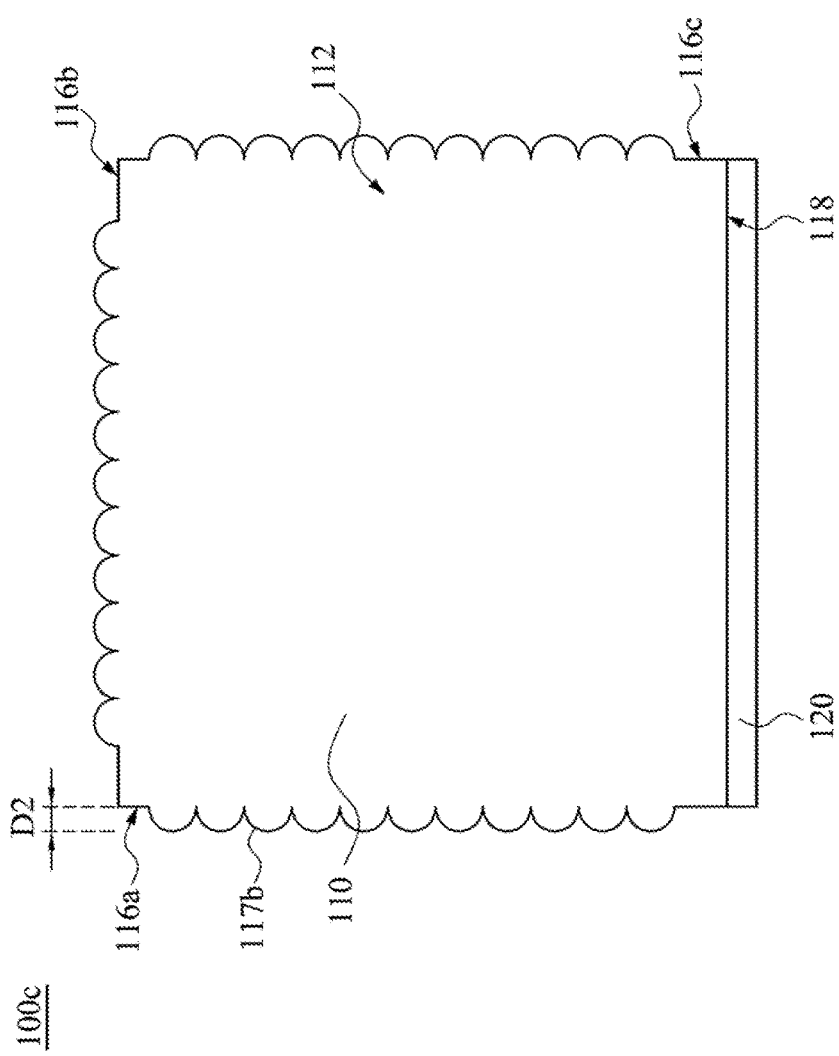
FIG. 5 is a front view of a light emitting device according to one embodiment of the present invention.

FIG. 5 is a front view of a light emitting device 100c according to one embodiment of the present invention. The light emitting device 100c includes the light guide plate 110 and the light source 120. The difference between this embodiment and the embodiment shown in FIG. 4 is that the shape of a concave-convex structure 117b of the light guide plate 110 is protruding semiellipse. The concave-convex structure 117b protrudes outward from the third surfaces 116a, 116b, 116c, and a perpendicular distance D2 between a top end of the concave-convex structure 117b and the third surface that the top end is located (116a, 116b, or 116c) may be in a range from 0.5 mm to 1.0 mm. When the light source 120 emits light, the light of the light source 120 may enter the light guide plate 110 from the light incident surface 118 and transmit to the concave-convex structure 117b of the third surfaces 116a, 116b, 116c, such that the light may irradiate out from the concave-convex structure 117b due to refraction, and may be reflected back to the light guide plate 110 by the concave-convex structure 117b. Hence, the light guide plate 110 can be prevented from forming light and dark contrast in a specific region, thereby improving the desired optical conditions.

FIG. 6 is a front view of a light emitting device 100d according to one embodiment of the present invention. The light emitting device 100d includes a light guide plate 110a and the light source 120. The shape of the light guide plate 110a is circular, and the shape of a concave-convex structure 117c of the light guide plate 110a is protruding semicircular. Moreover, the third surface 116 has a first arc surface 119a, a second arc surface 119b, and a third arc surface 119c that are connected. The second arc surface 119b faces the light source 120, and the first arc surface 119a and the third arc surface 119c are respectively adjacent to two sides of the light incident surface 118. In this embodiment, the second arc surface 119b has the concave-convex structure 117c, and the first and third arc surfaces 119a, 119c do not have the concave-convex structure 117c.

When the light source 120 emits light, the light of the light source 120 may enter the light guide plate 110a from the light incident surface 118 and transmit to the concave-convex structure 117c of the second arc surface 119b of the third surface 116, such that the light may irradiate out from the concave-convex structure 117c due to refraction, and may be reflected back to the light guide plate 110a by the concave-convex structure 117c. Hence, the light guide plate 110a can be prevented from forming light and dark contrast in a specific region (e.g., the upper semicircle of FIG. 6 away from the optical-coupling region of the light source 120), thereby improving the desired optical conditions.

Furthermore, in another embodiment, the first or third arc surfaces 119a, 119c of the third surface 116 may also have the concave-convex structure 117c as deemed necessary by designers.

FIG. 7 is a front view of a light emitting device 100e according to one embodiment of the present invention. The light emitting device 100e includes the light guide plate 110a and the light source 120. The shape of a concave-convex structure 117d of the light guide plate 110a is recessed semicircular. Moreover, the first and third arc surfaces 119a, 119c have the concave-convex structure 117d, and the second surfaces 119b does not have the concave-convex structure 117d.

When the light source 120 emits light, the light of the light source 120 may enter the light guide plate 110a from the light incident surface 118 and transmit to the concave-convex structures 117d of the first and third arc surfaces 119a, 119c of the third surface 116, such that the light may irradiate out from the concave-convex structure 117d due to refraction, and may be reflected back to the light guide plate 110a by the concave-convex structure 117d. Hence, the light guide plate 110a can be prevented from forming light and dark contrast in a specific region (e.g., the upper semicircle of FIG. 7 away from the optical-coupling region of the light source 120), thereby improving the desired optical conditions.

Furthermore, in another embodiment, the second arc surface 119b of the third surface 116 may also have the concave-convex structure 117d as deemed necessary by designers.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A light emitting device, comprising:
   a light guide plate which is a rectangular structure, and having a first surface, a second surface that is opposite to the first surface, three third surface, and a light incident surface;
   a display layer located below the first surface of the light guide plate, wherein the three third surfaces and the light incident surface are located between the first surface and second surface, and two of the three third surfaces adjoin the light incident surface, and the other is opposite the light incident surface, each of the three third surfaces have concave-convex structures continuously formed thereon except on corner portions of the light guide plate; and
   a light source located on the light incident surface, wherein when the light source emits light, the light of the light source enters the light guide plate from the light incident surface and transmits to the concave-convex structure, such that some of the light irradiates out from the concave-convex structure due to refraction and some of the light is reflected back to the light guide plate by the continuous concave-convex structure.

2. The light emitting device of claim 1, wherein a shape of the continuous concave-convex structure comprises triangle, semicircular, semiellipse, or a combination thereof.

3. The light emitting device of claim 1, wherein the display layer is an electrophoresis display module.

\* \* \* \* \*